United States Patent [19]

Biverot

[11] Patent Number: 5,995,266
[45] Date of Patent: Nov. 30, 1999

[54] OPTO-MECHANICAL DEFLECTOR DEVICE FOR LINE DISPLAYS

[75] Inventor: Hans Biverot, Hässelby, Sweden

[73] Assignee: Celsiustech Electronics AB, Jarfalla, Sweden

[21] Appl. No.: 09/051,312

[22] PCT Filed: Oct. 2, 1996

[86] PCT No.: PCT/SE96/01233

§ 371 Date: Apr. 6, 1998

§ 102(e) Date: Apr. 6, 1998

[87] PCT Pub. No.: WO97/14135

PCT Pub. Date: Apr. 17, 1997

[30] Foreign Application Priority Data

Oct. 9, 1995 [SE] Sweden .................................. 9503505

[51] Int. Cl.⁶ .................................................. G02B 26/08
[52] U.S. Cl. .......................... 359/201; 359/202; 351/158; 345/8
[58] Field of Search .................................. 359/201, 202, 359/223–226, 209–212, 741, 742, 850, 851; 348/51, 54; 345/7–9, 30–33, 43, 55, 84–86, 108, 110; 351/158

[56] References Cited

U.S. PATENT DOCUMENTS 4,870,486  9/1989  Nakagawa et al. ...................... 358/92
5,327,153  7/1994  Biverot ........................................ 345/5
5,585,960  12/1996  Sato et al. ................................. 359/223

FOREIGN PATENT DOCUMENTS 0 253 121 A2  1/1988  European Pat. Off. .
500061  3/1994  Sweden .

OTHER PUBLICATIONS

Motamedi et al., Miniaturized micro–optical scanners, Optical Engineering, Nov. 1994, vol. 33, No. 11, pp. 3616–3623.

*Primary Examiner*—James Phan
*Attorney, Agent, or Firm*—Pollock, Vande Sande & Amernick

[57] ABSTRACT

An opto-mechanical deflector device is used for line displays and is worn by an observer. By use of the deflector device, the line presented by the line display on the observer's retina can be perceived as a two-dimensional image. The deflector device comprises, for each respective eye, a plurality of similar subsidiary deflectors which are spread out in a one-dimensional or two-dimensional matrix across a surface corresponding to the desired angle coverage for the respective eye. The subsidiary deflectors are provided in such a number that the lines which the line display presents can be seen unbroken, irrespective of the line of sight of the eye within the field of view of the deflector device.

20 Claims, 4 Drawing Sheets a          b          c          d

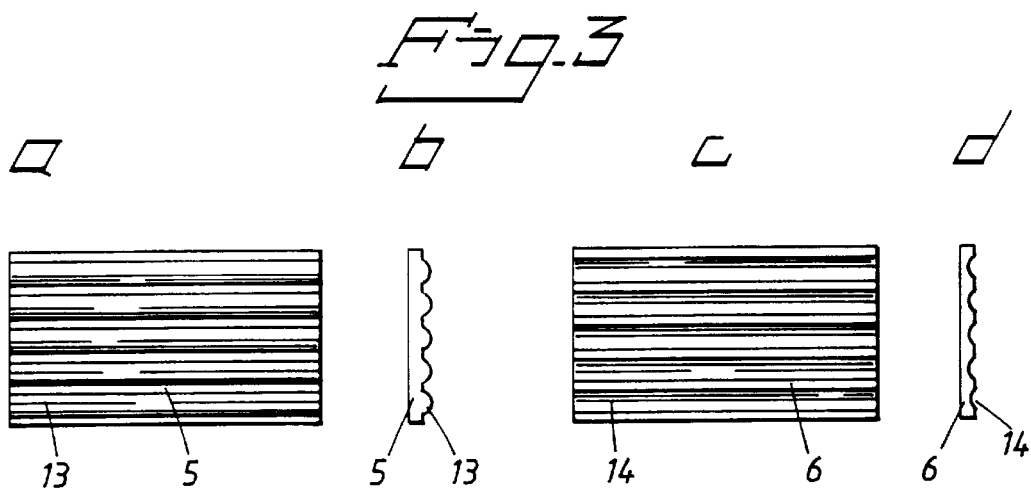
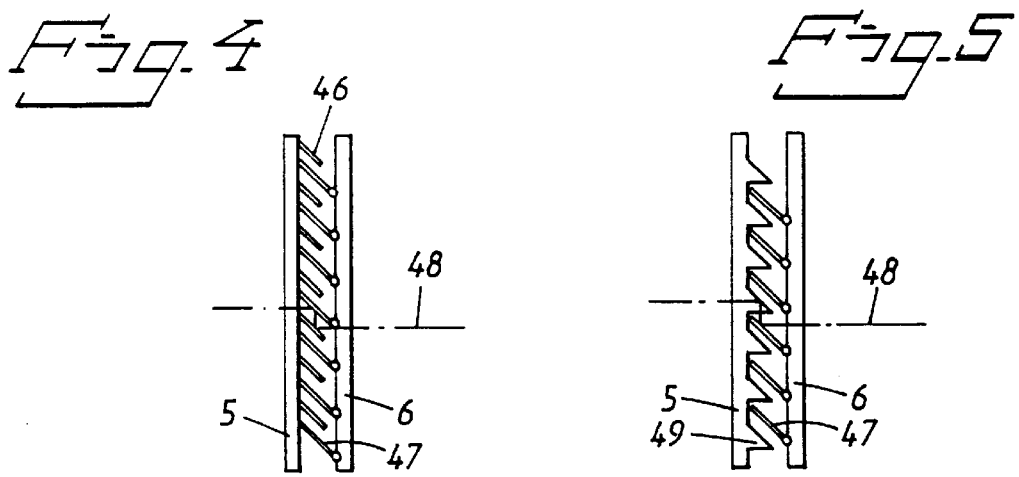
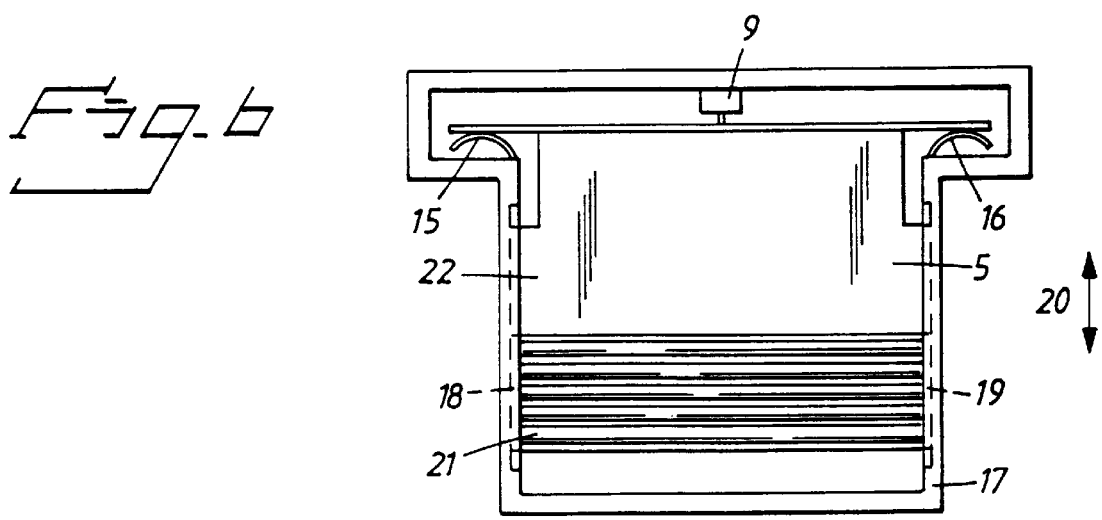

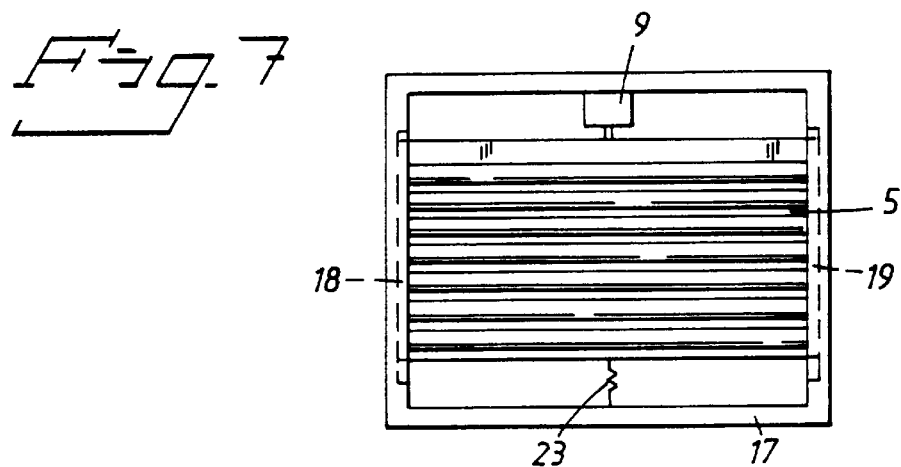
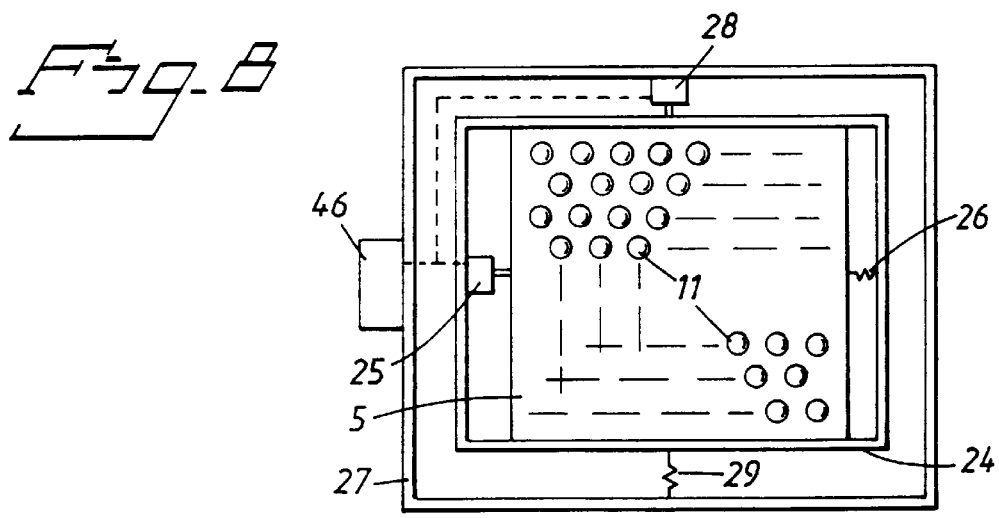
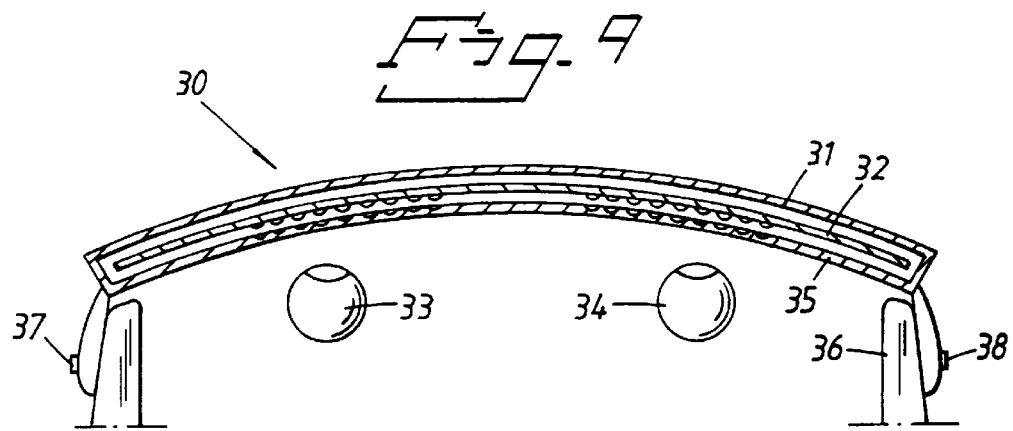

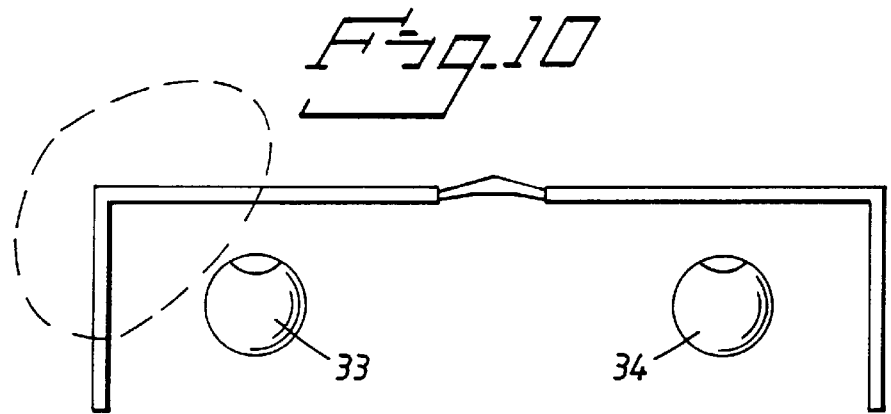
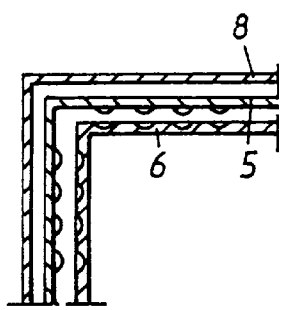
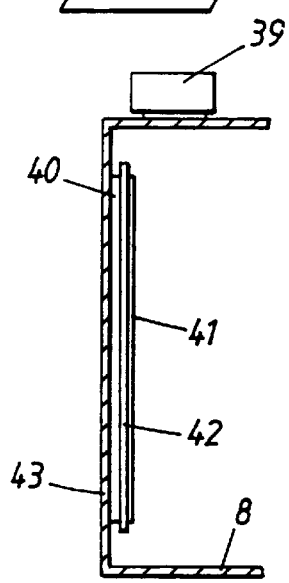
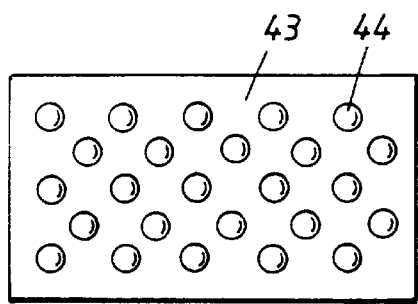
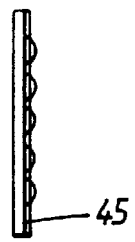

OPTO-MECHANICAL DEFLECTOR DEVICE FOR LINE DISPLAYS

FIELD OF THE INVENTION

The present invention concerns an opto-mechanical deflector device which is worn by an observer, and is used for visual observation of a line display, and is intended to be worn close to the eye or eyes of the observer.

BACKGROUND OF THE INVENTION

Optical deflectors for deflecting light are found in a number of different forms and are included, for example in the presentation device described in Swedish Patent 500,061, as a component worn by an observer and used for widening the line presented by a line display. The above patent proposes opto-mechanical deflection by means of rotating or vibrating mirrors, or by means of rotating wedges. Electro-optical deflection is also proposed.

There are a number of demands and objectives in respect to the properties which should be satisfied by a deflection device worn by an observer and suitable for a presentation device according to this patent. The deflector device should have the following properties, among others being:

achromatic, mechanically simple, low in volume and lightweight, suitable for mass-production, for example by replica techniques, that is inexpensive, usable for several applications.

Opto-mechanical solutions have long existed in traditional instrumental optics. For example, use is sometimes made of a so-called optical micrometer. The latter can consist of two optical wedges which are turned towards one another, or a pair of lenses in which the lenses have the same refractive power, but different characteristics. When one lens is shifted sideways relative to the other, the optical beam path is refracted by an angle which is proportional to the movement. The optical systems can be rendered achromatic and generally give small residual errors. Other opto-mechanical deflector solutions involve various types of controlled or rotating mirrors, rotating prisms, etc. These optical systems have undergone extensive development on the basis of IR technology and laser technology. However, the known opto-mechanical solutions, as outlined above, still involve comparatively large and cumbersome mechanics, which are in addition relatively expensive and difficult to manufacture.

In recent times there have been considerable developments in the sector of micromechanics, and these developments have resulted in, among other things, micromechanical mirror matrices for image projection, etc. The production processes used in semiconductor technology are employed in the manufacture of the mirror matrices. The known mirror matrices are unsuitable for use as a deflector device worn by an observer, because the small mirror dimensions give powerful diffraction effects. It has also been proposed to use micro-lens matrices which can be displaced relative to each other. A micro-optical laser scanner based on micro-lens matrices is already known from M. Edward Montamedi, "Miniaturized micro-optical scanners", Optical Engineering, vol. 33, no. 11, November 1994, pages 3616 to 3623. This micro-optical laser scanner involves small dimensions, <1 mm, and there are both diffractive and refractive elements. On account of the diffraction effects which occur with these small dimensions, these micro-lens matrices are also unsuitable for use in the application according to the invention, i.e. to be worn by an observer.

Electro-optical solutions are in most instances based on some form of voltage-controlled crystal optics in combination with polarizers. They generally require high voltages, and this creates a problem. The solutions are often quick to implement, but require a relatively large construction volume.

Acoustic-optical deflectors are based on Bragg effects in acoustically generated gratings. Thus, they are in general greatly limited in chromatic terms, but otherwise have many attractive properties.

A new and promising technique uses so-called liquid crystals. A dynamic phase grating can be generated with high resolution, in principle a hologram. However, this effect is based on the wave characters of light and is therefore limited in wavelength.

In summary the opto-mechanical solutions lead to achromatic deflectors, but they can be cumbersome and difficult to manufacture. The other principles which have been mentioned above make use of the wave nature of light and are therefore limited spectrally or are even completely impossible because of diffraction effects.

SUMMARY OF THE INVENTION

The object of the present invention is to make available a deflector device which as far as possible satisfies the demands and the requirements set out hereinabove with respect to the properties of the deflector device.

The object of the invention is achieved by means of a deflector device, which comprises for each respective eye a plurality of similar opto-mechanical subsidiary deflectors which are spread out in a one-dimensional or two-dimensional matrix across a surface corresponding to the desired angle coverage for the respective eye and so close that the lines which the line display presents can be seen unbroken, irrespective of the line of sight of the eye within the field of view of the deflector device, i.e. so close that the pupil of the eye at all times receives radiation which has been deflected in at least one of the subsidiary deflectors. By means of incorporating a plurality of subsidiary deflectors, a downscaling of dimensions is achieved, which facilitates a compact and lightweight design. At the same time, this downscaling means that the subsidiary deflections can still be regarded as a geometrical optical problem, where diffraction effects do not yet give interference. This provides a robust multi-element solution which has mm dimensions and is based on mechanical deflection. Each of the subsidiary deflectors advantageously has an aperture of at least 1 mm, and preferably at least 2 mm.

According to one advantageous embodiment, the subsidiary deflectors of the deflector device are made up of at least two multi-element matrices, of which at least one multi-element matrix is arranged to be movable, and where one subsidiary deflector is formed by the cooperation between one respective matrix element in each multi-element matrix. The matrix elements of the multi-element matrices can consist of optical elements in the form of circular lenses, cylindrical lenses, mirrors or prisms. Each type can be used on its own or in any suitable combination with other types.

In the case where the subsidiary deflectors are made up of one movable multi-element matrix and one fixed multi-element matrix, a simple encased embodiment can be obtained. The embodiment is characterized in that the detector device comprises a transparent protective casing which is designed, in conjunction with the fixed multi-element matrix, to enclose the movable multi-element matrix.

In order to avoid disruptive double images etc., the deflector device comprises, in accordance with yet another advantageous embodiment, masks which are associated with the multi-element matrices for the purpose of screening off inactive parts within the field of view.

According to a further embodiment, corrective glass for defective sight is integrated in the multi-element matrices of the deflector device. By integrating the sight-correcting means, a compact deflector device is obtained which can also be worn by persons who require correction of defective vision.

According to one embodiment, enhanced lateral vision is obtained by dividing the multi-element matrices into two angled parts.

By arranging a switch to open the field of view to the left eye and to the right eye alternately, an observer can be presented with stereo images.

A switch can also be arranged for opening and closing the field of view for one eye during generation of an image in combination with deflection. This means that the observer is supplied with additional image information in the component being worn by the observer, and the image information in the line display can therefore be further reduced.

The subsidiary deflectors are advantageously designed in such a way that when they are in the inactivated state, they assume a position which leaves the field of view essentially unaffected. In this way, the observer can keep the deflector device on, even when it is not being used.

According to one embodiment, the deflector device is designed to be worn as spectacles. According to an alternative embodiment, the deflector device can be designed to form a device resembling a vizor.

A drive member for effecting mutual displacement of the multi-element matrices generates a linear or non-linear mutual displacement of the multi-element matrices at one or two right angles. In the case of a non-linear movement, the deflector device can have a simpler and less expensive construction. The solution at the same time presupposes that the presentation of the line display is coordinated with the non-linear movement of the deflector device. In this context, reference is made Swedish patent application SN 9503503 corresponding to U.S. patent application Ser. No. 09/043,860 filed at the same time and relating to non-linear scanning in a deflector device. The twin drive arrangement means that the line presented by a line display can be widened either laterally or vertically. The possibility also exists of compensating for the inclination of the observer's head in relation to the line display.

In order to compensate for angle errors between a one-dimensional deflector and a line display, a device compensating for angle errors and taking the form of, for example, a pendulum arrangement can be included in the deflector device.

According to one preferred embodiment, the deflector device comprises an optically transparent part in the observer's field of view, outside the field of view which the deflectors pick up.

Beam division within the same field of view can be obtained by having the multi-element matrices comprise transparent parts between the matrix elements. By means of this so-called physical beam division within the same field of view, a line display image can be presented and perceived at the same time as an image presented in direct look-through. The possibility also exists of filtering presented images by providing the transparent parts and/or the matrix elements with filtering means.

BRIEF DESCRIPTION OF THE DRAWINGS

The invention will be described in greater detail hereinbelow on the basis of some illustrative examples with reference to the attached drawing, in which:

FIG. 3a shows a front view of a second example of a first multi-element matrix included in a deflector device according to the invention, FIG. 3b shows a side view of the multi-element matrix according to FIG. 3a, FIG. 3c shows a front view of a second example of a second multi-element matrix included in a deflector device and intended to cooperate with the first multi-element matrix according to FIGS. 3a and 3b, FIG. 3d shows a side view of the multi-element matrix according to FIG. 3c, FIG. 4 shows a side view of one example of two cooperating multi-element matrices with mirror elements, FIG. 5 shows a side view of one example of two cooperating multi-element matrices comprising mirror elements in one and prisms in the other, FIG. 6 shows a first schematic example of how a first multi-element matrix included in the deflector device is arranged to be displaceable in one direction, FIG. 7 shows a second schematic example of how a first multi-element matrix included in the deflector device is arranged to be displaceable in one direction, FIG. 8 shows an example of how a first multi-element matrix included in the deflector device is arranged to be displaceable in two directions at right angles, FIG. 9 is a schematic representation, in horizontal cross-section and level with the eyes of the observer, of a deflector device which is designed to form part of an arrangement resembling a vizor, FIG. 10 shows an example of a deflector device with "lateral vision", FIG. 10a shows a section, in the drawing plane, through a part of the deflector device according to FIG. 10, FIG. 11 shows an example of a deflector device according to the invention in a stereo image configuration, and FIGS. 12a and 12b show examples of multi-element matrices with a masking or filtering function and included in a deflector device according to the invention.

DETAILED DESCRIPTION OF THE INVENTION

Figure 1:
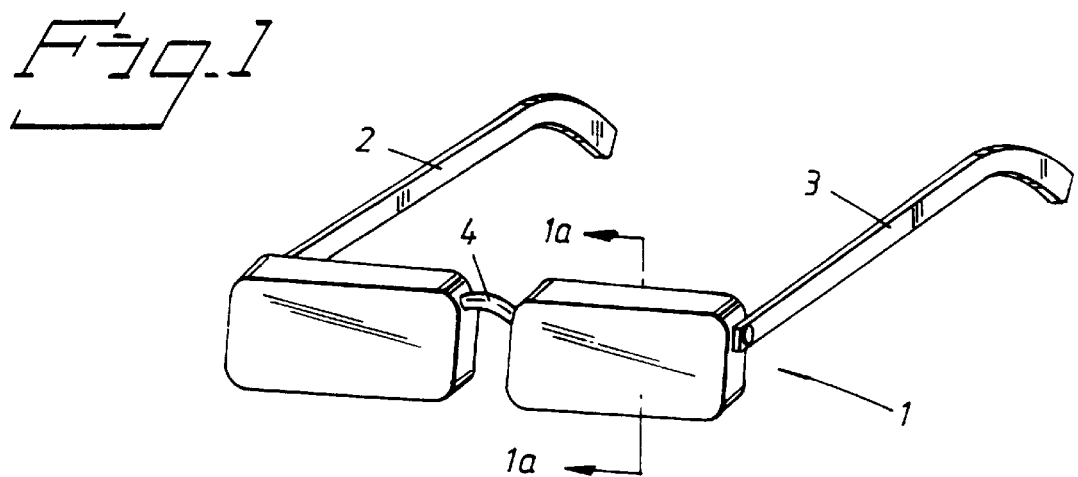
FIG. 1 is a schematic representation of one example of a deflector device according to the present invention, intended to be worn as glasses.
Figure 1A:
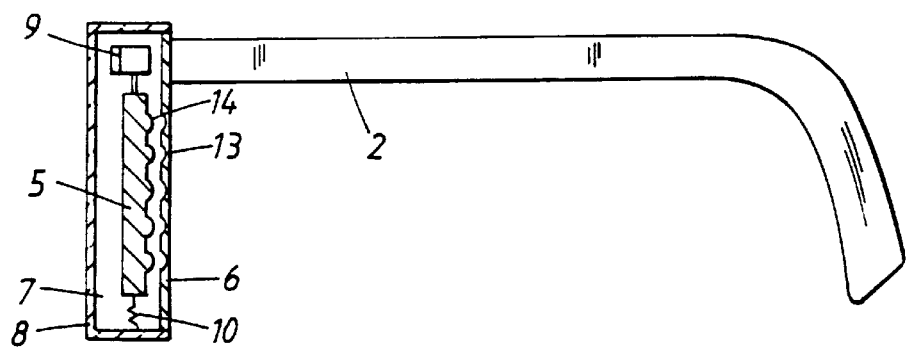
FIG. 1a shows a cross-section along line 1a—1a, in FIG. 1, through the deflector device according to the present invention.
Figure 2:
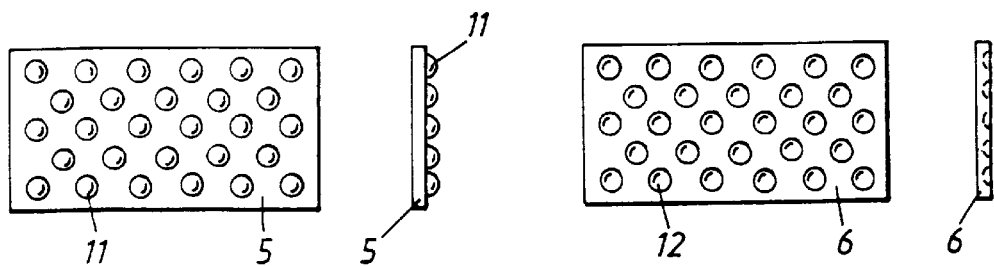
FIG. 2a shows a front view of a first example of a first multi-element matrix included in a deflector device according to the present invention.
FIG. 2b shows a side view of the multi-element matrix according to FIG. 2a, FIG. 2c shows a front view of a first example of a second multi-element matrix included in a deflector device and intended to cooperate with the first multi-element matrix according to FIGS. 2a and 2b.
FIG. 2d shows a side view of the multi-element matrix according to FIG. 2c.

The deflector device 1 shown in FIGS. 1 and 1a is designed to be worn by an observer (not shown) in the same way as one wears spectacles, i.e. by means of two side arms 2, 3 and a bridge 4. In front of both eyes of the observer there are a first multi-element matrix 5 and a second multi-element matrix 6. The first multi-element matrix 5 is movable in relation to the other parts of the deflector device 1 and is enclosed in a space 7 formed by the cooperation of the second multi-element matrix 6 and a transparent protective casing 8. A drive member 9 cooperating with a spring member 10 provides for the displacement of the multi-element matrix 5 parallel to the second multi-element matrix 6.

According to a first embodiment shown in FIGS. 2a–2d, the elements in the first multi-element matrix 5 consist of circular converging lenses 11, while the elements in the second multi-element matrix consist of circular diverging lenses 12. Each lens 11 is arranged to be displaced in front of a corresponding lens 12. The multi-element matrices are arranged in line with each other so that a thickened area in the one multi-element matrix is matched by a thinned area in the other multi-element matrix.

A second embodiment of multi-element matrices is shown in FIGS. 3a–3d. In this case, the elements in the first multi-element matrix 5 consist of converging cylindrical lenses 13, while the elements in the second multi-element matrix consist of diverging cylindrical lenses 14. This embodiment permits efficient utilization of the matrix surface.

A third embodiment of multi-element matrices is shown in FIG. 4. The first multi-element matrix 5 is in this case provided with fixed mirror elements 46, while the second multi-element matrix 6 is provided with tiltable mirror elements 47. When the multi-element matrices 5, 6 are mutually displaced, the inclination of the tiltable mirror elements, and consequently the direction of the beams 48, are modified.

According to a fourth embodiment of multi-element matrices as shown in FIG. 5, the first multi-element matrix has been provided with prisms 49, while the second multi-element matrix 6 is made up in the same way as shown in FIG. 4. As in the example described with reference to FIG. 4, the inclination of the tiltable mirror elements is modified when the multi-element matrices 5, 6 are displaced in relation to each other, and this in turn results in the deflection of beams 48.

FIG. 6 is a schematic illustration of how a first multi-element matrix 5 is arranged to be displaceable in one direction. According to this embodiment, the multi-element matrix 5 is suspended on resilient members 15, 16 and controlled via guide tracks 18, 19 arranged in a frame 17. A drive member 9 moves the multi-element matrix 5 to and fro along the guide tracks 18, 19 of the frame, i.e. in the direction indicated by the arrow 20. In a modified embodiment, instead of the separate resilient members 15, 16 which are shown, the outer ends of the upper part of the multi-element matrix shown in this Figure can be designed to be resilient. In the embodiment shown, the deflector part takes up only the lower part 21 of the multi-element matrix, while the upper part 22 consists of a transparent part. In this way, the observer can be presented with two subsidiary fields of view. The deflector part and the transparent part can of course be changed around. Nor is there anything to prevent one variant of the deflector from being arranged in front of one eye of the observer and another variant in front of the observer's other eye.

FIG. 7 shows a further example of how the movement of the multi-element matrix can be effected in one direction. The embodiment corresponds essentially to the embodiment which has been described with reference to FIG. 6. However, the suspension of the multi-element matrix differs in that a spring member 23 is arranged to act between the lower part of the frame 17 in the figure and the multi-element matrix 5, i.e. a position essentially opposite to the position of the drive member 9.

FIG. 8 shows an example in which the movable multi-element matrix can be moved in two dimensions. In this case, the multi-element matrix 5 is arranged in a first frame 24. The multi-element matrix is displaced in a first direction, the x direction, by means of a drive member 25 cooperating with a spring member 26. The first frame 24 is in turn arranged in a second frame 27 which is designed to displace the first frame 24 in a second direction, the y direction, perpendicular to the first direction, by means of a second drive member 28 cooperating with a spring member 29. Arranged on the second frame 27 there is a device which compensates for angle error. By means of this device for angle error compensation, the drive members 25 and 28 are controlled to compensate for the inclination of the observer's head in relation to the line display.

In the inactivated state, the multi-element matrices can assume a neutral position in which they leave the field of view essentially unaffected. This can be achieved by defining the neutral position as the position where elements included in the multi-element matrices are situated in line with corresponding elements of other included multi-element matrices, and by ensuring that the elements which thus form a subsidiary deflector all neutralize each other optically. In this neutral position, the multi-element matrices can almost be considered as a transparent disc.

According to the embodiment shown in FIG. 9, the deflector device 1 can be incorporated in a vizor 30. In the embodiment shown, the vizor is made up of an outer protective glass 31, a displaceable multi-element matrix 32 provided for both eyes 33, 34 of the observer, and a fixed multi-element matrix 35 nearest the observer's eyes, which is common to both eyes. As is indicated in the figure, the vizor can be joined to a helmet part 36 via hinges 37, 38.

FIGS. 10 and 10a show an example of how the observer's lateral vision can be enhanced. This has been achieved by introducing angled deflectors where the multi-element matrices 5, 6 are divided into two parts which are at an angle to each other.

By controlling the opening of the deflector device alternately between the observer's eyes, stereo images can be formed. According to FIG. 11, a switch 39 is in this case provided for this alternate opening between the observer's eyes. The switch is connected to two electrodes 40, 41, with an intermediate layer 42, which intermediate layer with electrodes is arranged on the inner side of the protective casing 8. The layer 42 is kept open or closed for incident light as a function of the supply from the electrodes.

A switch 39 can also be used for opening and closing the field of view of one eye while generating an image in combination with the deflection generated simultaneously by the deflector device.

FIGS. 12a and 12b show a further example of a multi-element matrix which can be included in the deflector device according to the invention. The multi-element matrix 43 is in this case provided with circular lenses 44. Between these lenses 44 there is a layer 45 which, according to one alternative, has a filtering function and makes it possible for a filtered part of the background to be displayed at the same time as a line display image. According to another alternative, the layer 45 functions as a mask which screens off inactive parts of the field of view.

The invention is not limited to the illustrative embodiments which have been described hereinabove. Among other things, different areas of application are conceivable. For example, the deflector device could be used in static applications for correcting squint, for instance. The deflector device could also be used as a possible replacement for deflectors in bearing devices of older types which need to be modernized.

I claim:

1. An opto-mechanical deflector device used for visual observation of a line display, and intended to be worn close to the eye or eyes of an observer, the deflector device comprising for each respective eye a plurality of similar opto-mechanical subsidiary deflectors positioned to form a one-dimensional or two-dimensional matrix across a surface corresponding to the desired angle coverage for the respective eye and so close that the lines which the line display presents can be seen unbroken, irrespective of the line of sight of the eye within the field of view of the deflector device, and the pupil of the eye at all times receives radiation which has been deflected in at least one of the subsidiary deflectors.

2. A deflector device according to claim 1 wherein the subsidiary deflectors are made up of at least two multi-element matrices, of which at least one multi-element matrix is movable, and wherein a subsidiary deflector is formed by the cooperation between one respective matrix element in each multi-element matrix.

3. A deflector device according to claim 2, wherein the elements of the multi-element matrices consist of optical elements in the form of one of circular lenses, cylindrical lenses, mirrors and prisms.

4. A deflector device according to claim 2 wherein the subsidiary deflectors are made up of one movable multi-element matrix and one fixed multi-element matrix, and the deflector device comprises a transparent protective casing which in conjunction with the fixed multi-element matrix, encloses the movable multi-element matrix.

5. A deflector device according to claim 2, wherein a corrective glass for defective sight is integrated in the multi-element matrices of the deflector device.

6. A deflector device according to claim 2, further comprising a drive member for effecting a linear displacement of the multi-element matrices.

7. A deflector device according to claim 6, wherein the drive member effects a displacement of the multi-element matrices in two perpendicular directions.

8. A deflector device according to claim 2, further comprising a drive member for effecting a non-linear displacement of the multi-element matrices.

9. A deflector device according to claim 2, wherein an arrangement for compensating for angle error is provided to compensate for an angle error between a one-dimensional deflector and a line display.

10. A deflector device according to claim 2, wherein the multi-element matrices comprise transparent parts between the matrix elements.

11. A deflector device according to claim 10, wherein at least one of the a) transparent parts and b) matrix elements of the multi-element matrix comprise filtering means.

12. A deflector device according to claim 2, wherein the multi-element matrices are divided into two angled parts.

13. A deflector device according to claim 2, wherein the deflector device further comprises masks associated with the multi-element matrices for screening off inactive parts within the field of view.

14. A deflector device according to claim 1, wherein the deflector device is designed to be worn as spectacles.

15. A deflector device according to claim 1, wherein the deflector device is designed to form part of a vizor-like arrangement.

16. A deflector device according to claim 1, wherein the deflector device comprises an optically transparent part in the observer's field of view, outside the field of view which the subsidiary deflectors pick up.

17. A deflector device according to claim 1, wherein each of the subsidiary deflectors has an aperture of at least 1 mm.

18. A deflector device according to claim 1, further comprising a switch for alternatively opening the field of view to the left eye and to the right eye.

19. A deflector device according to claim 1, further comprising a switch for opening and closing the field of view for one eye during generation of an image in combination with deflection.

20. A deflector device according to claim 1, wherein the subsidiary deflectors are designed to assume, in the inactivated state, a position which leaves the field of view essentially unaffected.

\* \* \* \* \*